United States Patent

Mortimore et al.

[11] Patent Number: 5,129,021
[45] Date of Patent: Jul. 7, 1992

[54] OPTICAL STAR COUPLERS

[75] Inventors: David B. Mortimore, Ipswich; David B. Payne, Wickham Market; Benjamin J. Ainslie, Ipswich, all of England

[73] Assignee: British Telecommunications Public Limited Company, Great Britain

[21] Appl. No.: 634,880
[22] PCT Filed: Jul. 6, 1989
[86] PCT No.: PCT/GB89/00769
 § 371 Date: Jan. 10, 1991
 § 102(e) Date: Jan. 10, 1991
[87] PCT Pub. No.: WO90/00751
 PCT Pub. Date: Jan. 25, 1990

[30] Foreign Application Priority Data

Jul. 12, 1988 [GB] United Kingdom ............ 8816521

[51] Int. Cl.$^5$ ............................................ G02B 6/28
[52] U.S. Cl. ........................................ 385/46; 385/43
[58] Field of Search ............... 350/96.15, 96.16; 385/43, 46, 48

[56] References Cited

U.S. PATENT DOCUMENTS

| 4,360,248 | 11/1982 | Bickel et al. | 350/96.16 |
|---|---|---|---|
| 4,392,712 | 7/1983 | Ozeki | 350/96.16 |
| 4,449,781 | 5/1984 | Lightstone | 350/96.15 |
| 4,586,784 | 5/1986 | Tremblay | 350/96.15 |
| 4,666,234 | 5/1987 | Emkey | 350/96.15 |
| 4,836,644 | 6/1989 | Eisenmann et al. | 350/96.16 |
| 4,869,570 | 9/1989 | Yokohama et al. | 350/96.15 |
| 4,948,217 | 8/1990 | Keck et al. | 350/96.15 |
| 5,019,301 | 5/1991 | Coden et al. | 264/1.5 |

FOREIGN PATENT DOCUMENTS

| 12120/83 | 11/1986 | Australia . | |
|---|---|---|---|
| 0013972 | 8/1980 | European Pat. Off. . | |
| 0198761 | 10/1986 | European Pat. Off. . | |
| 0212954 | 3/1987 | European Pat. Off. | 350/96.16 |
| 55-127502 | 12/1980 | Japan . | |
| 57-186730 | 2/1983 | Japan . | |
| 58-153916 | 12/1983 | Japan . | |
| 61-28908 | 6/1986 | Japan . | |
| 2199423 | 7/1988 | United Kingdom . | |

OTHER PUBLICATIONS

Electronics Letters, vol. 22, No. 6, Mar. 13, 1986, Mortimore et al., "Low loss joints between dissimilar fibers by tapering," etc. pp. 318-319.
Electronics Letters, vol. 23, No. 20, Sep. 24, 1987, Minelly et al., "Single-mode fibre Y-junction beam splitter", pp. 1087-1088.

Primary Examiner—Frank Gonzalez
Attorney, Agent, or Firm—Nixon & Vanderhye

[57] ABSTRACT

An optical 1×N star coupler has a single mode input fibre (I) and N single mode output fibres ($O_1$) forming an output fibre assembly. The output fibres (O) are tapered within a former (2) which holds each output fibre (O) so it is positioned substantially identically relative to the remaining output fibres. The input fibre (I) is also tapered such that the fundamental mode field of the input fibre (I) and output fibre assembly are substantially equal. The identical relative positions of the output fibres (O) provides a wavelength independent 1×N star coupler.

6 Claims, 1 Drawing Sheet

OPTICAL STAR COUPLERS

The invention relates to optical couplers, and in particular to couples for disturbing light from one single mode optical fibre between two or more single mode optical fibres.

It is an object of the present invention to provide an optical coupler in which the light is transferred equally from the one single mode fibre to the other fibres independently of wavelength.

According to a first aspect the present invention comprises an optical star coupler formed as a taper having an input, single mode fibre and at least three identical output, single mode fibres, which output fibres form an output fibre assembly characterised in that each of the output fibres is positioned substantially identically relative to the remaining output fibres throughout the taper, the fundamental mode fields of the input fibre and output fibre assembly being substantially matched at some region of the taper.

The positions of the fibres ensure that the output fibres are illuminated with the same optical field amplitude and phase and because the distribution of fibres around a given output fibre is identical to that around any other there is zero net power transfer between the array of output fibres.

To produce a low loss device, there must be a gradual change in the mode field from that of the single input fibre to that of the output fibres. This mode transformation is accomplished by means of the taper. The space between the fibre array must first be filled with material of the same or slightly lower refractive index than that of the fibre cladding. This filling material is conveniently the same material as the cladding, for example silica.

According to a second aspect of the present invention a method of forming a 1×N optical star coupler having an input, single mode fibre and N identical output, single mode fibres where N is greater than or equal to three characterised in including the steps of:

(a) forming N+1 fibre portions each comprising a single mode optical fibre fusion spliced to a coreless fibre;

(b) placing the N+1 fibre portions into a former such that the N output, single mode fibres extend as a ring from one end of the former each positioned substantially identically relative to the remaining fibres in the ring, and one single mode input fibre extends from the other end of the former; all the fusion splices being in substantially the same plane;

(c) forming a taper such that the fundamental mode fields on each side of the fusion splices are substantially matched at some region of the taper.

Embodiments of the invention and methods of fabrication will now be described by way of example only with reference to the accompanying drawings of which FIG. 1 is a perspective view of a glass former for holding the fibres in position while forming a taper;

Figure 1:
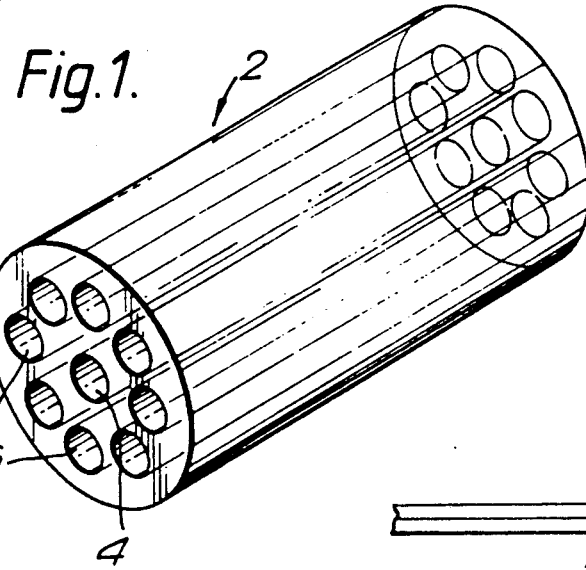
Figure 2:
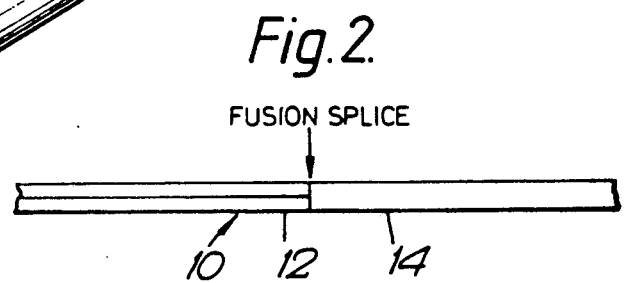
FIG. 2 is a diagrammatic cross-sectional view of a single mode fibre fused to a coreless fibre prior to tapering using the former of FIG. 1.
Figure 3:
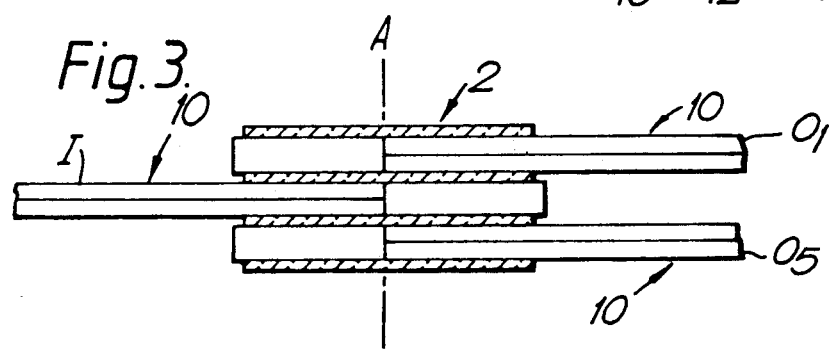
FIG. 3 is a diagrammatic cross-section view of the former of FIG. 1 and fibres of FIG. 2 prior to forming a taper.

The fibres may be held in their correct relative position for tapering by a glass former 2 as shown in FIG. 1. This structure, which consists of one central hole 4 surrounded by eight equally spaced holes 6 at a constant radius, may conveniently be made by drawing down a large drilled glass rod. The rod is pulled such that the holes are just large enough to accept a single fibre each. Nine lengths of fibre 10 are prepared and each comprises a single mode fibre 12 fusion spliced to a length of coreless or 'dummy' fibre 14 as shown in FIG. 2. Referring to FIG. 3, the fibres 10 are inserted into the former 2 so that the splices all lie in the same plane A so that a central fibre protrudes from the former 2 from the opposite end to the outer ring of fibres, only two of which are shown for clarity in FIG. 3. The central fibre forms the one input fibre (I), the remaining eight, the output fibres $O_1$–$O_8$. The assembly is then heated to a temperature sufficient for the glass former to shrink due to surface tension. Vacuum may be employed at this stage to assist the collapse and/or to remove air which may become trapped. Heating is continued until a homogeneous rod of silica is formed. The glass former is heated around the splice position and is pulled to form a taper. The heated length being sufficient to ensure small taper angles and hence a low loss device. Tapering is continued until the cores have reduced in size sufficiently such that the mode fields each side of the splice are reasonably well matched. In practice light could be launched into the central fibre and the device would be pulled until the output signal reaches a maximum.

Figure 4:
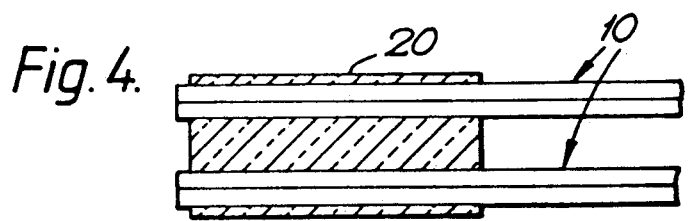
FIG. 4 is a diagrammatic cross-sectional end view of a former with no central hole.

An alternative fabrication technique involves using a glass former 20 without the central hole. In this method the prepared fibres 10 are inserted into the glass former 20, as shown in FIG. 4 (only two fibres are shown for clarity). The former 20 is collapsed as described above and it is then pulled to form a taper with a waist diameter equal to the diameter of a single fibre 10. The structure is cleaved at the waist and the resulting composite fibre end is fusion spliced to a single fibre. This fusion splice is then further tapered to equalise the mode fields on either side of the splice. The tapering is continued until maximum power transmission is obtained.

Figure 5:
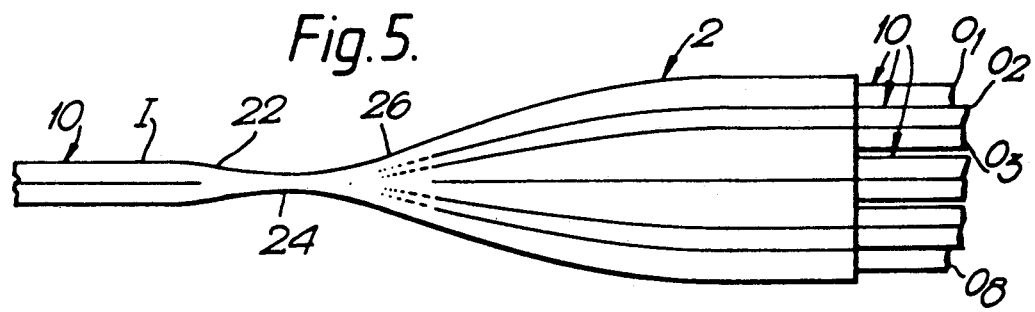
FIG. 5 is a diagrammatic longitudinal view of a coupler according to the present invention.

Referring now to FIG. 5, consider light propagating along the single input fibre I, towards the taper region marked 22. As light travels down the taper 22, its mode field expands and eventually becomes bounded by the cladding/external medium interface. In this central taper region 24 the fibre cores play little part in the field guidance and the output fibres $O_1$ to $O_8$ act as a single output fibre assembly. Therefore, the mode profiles of the single fibre I and output fibre assembly are reasonably well matched. This ensures that the optical field will traverse this critical region 24 with little loss. In the upward taper region, 26, the growing cores gradually capture equal amounts of the optical field such that when the fibres have reached their normal size, each fibre carries the same optical power.

1×N couplers having other N values may be formed by these methods. The output fibres need not be arranged in a symmetrical circular array. For example, four fibres can be arranged at the vertices of a rectangle and still obtain equal coupling as each fibre is positioned at the same relative distance and angular disposition from the other three, i.e. in that they are each positioned identically relative to the other output fibres.

The insertion of the fibres 10 into the former 20 may be aided by the use of a lubricating fluid that is readily evapourated before or during the application of heat to form the taper, for example, methanol, ethanol, acetone or other similar fluid.

What is claimed is:

1. An optical star coupler formed as a taper comprising:
   an input, single mode fibre;
   at least three identical output, single mode fibres, forming an output fibre assembly with each output fibre being positioned substantially identical relative to the remaining output fibres throughout the taper, wherein fundamental mode fields of the input fibre and output fibre assembly are substantially matched in some region of the taper.

2. A method of forming a 1×N optical star coupler having an input, single mode fibre and N identical output, single mode fibres, where N is greater than or equal to three, comprising the steps of:
   (a) forming N+1 fibre portions each having a single mode optical fibre fusion spliced to a coreless fibre;
   (b) placing the N+1 fibre portions into a former such that the N output, single mode fibres extend as a ring from one end of the former, each positioned substantially identically relative to the remaining fibres in the ring with one single mode input fibre extending from the other end of the former, and all fusion splices being in substantially the same plane; and
   (c) forming a taper such that fundamental mode fields on each side of the fusion splices are substantially matched in some region of the taper.

3. A method of forming a 1×N optical star coupler where N is greater than or equal to three, comprising the steps of:
   (a) inserting N identical single mode fibres into a former so as to extend from the same side of the former, each being positioned substantially identically relative to the remaining fibres;
   (b) forming a taper with a waist diameter substantially equal to the diameter of a single fibre;
   (c) cleaving the taper at the waist;
   (d) fusion splicing the cleaved taper to a single mode input fibre; and
   (e) further tapering the taper to equalise the field modes on either side of the splice.

4. A method of forming a coupler as claimed in either of claims 2 or 3 in which the insertion of the fibres into the former is lubricated.

5. A method of forming a coupler as claimed in claim 4, wherein the former is lubricated using methanol.

6. A method of forming a coupler as claimed in claim 2 or 3 in which equalisation of the field modes is determined by tapering until maximum power transmission from the the input fibre is obtained.

* * * * *